(12) United States Patent
Caumont et al.

(10) Patent No.: US 8,795,869 B2
(45) Date of Patent: Aug. 5, 2014

(54) MODULE FOR AN ELECTRIC ENERGY STORAGE ASSEMBLY

(75) Inventors: Olivier Caumont, Quimper (FR); Anne-Claire Juventin-Mathes, Quimper (FR); Karine Le Bras, Guilers (FR); Jean-Michel Depond, Quimper (FR)

(73) Assignee: BATSCAP, Gaberic (FR)

( * ) Notice: Subject to any disclaimer, the term of this patent is extended or adjusted under 35 U.S.C. 154(b) by 399 days.

(21) Appl. No.: 12/597,484

(22) PCT Filed: Apr. 24, 2008

(86) PCT No.: PCT/EP2008/054971
§ 371 (c)(1),
(2), (4) Date: Oct. 23, 2009

(87) PCT Pub. No.: WO2008/132122
PCT Pub. Date: Nov. 6, 2008

(65) Prior Publication Data
US 2010/0129703 A1    May 27, 2010

(30) Foreign Application Priority Data

Apr. 24, 2007   (FR) .................................... 07 54650

(51) Int. Cl.
| | | |
|---|---|---|
| *H01M 10/50* | (2006.01) | |
| *H01G 2/14* | (2006.01) | |
| *H01M 10/42* | (2006.01) | |
| *H01M 2/20* | (2006.01) | |
| *H01G 2/04* | (2006.01) | |
| *H01M 2/10* | (2006.01) | |
| *H01G 9/00* | (2006.01) | |
| *H01M 2/30* | (2006.01) | |
| *H01M 10/052* | (2010.01) | |

(52) U.S. Cl.
CPC ........ *H01M 10/5004* (2013.01); *H01M 10/503* (2013.01); *H01M 10/5095* (2013.01); *H01M 10/5075* (2013.01); *H01M 10/5016* (2013.01); *H01M 2/105* (2013.01); *H01M 10/5053* (2013.01); *H01G 2/14* (2013.01); *H01G 9/155* (2013.01); *H01M 10/425* (2013.01); *H01M 2/30* (2013.01); *H01M 10/052* (2013.01); *H01M 2/1077* (2013.01); *H01M 2/206* (2013.01); *H01G 2/04* (2013.01); *Y02E 60/12* (2013.01); *H01M 10/5067* (2013.01); *H01M 2/202* (2013.01)
USPC ............. 429/120; 429/99; 429/212; 429/159; 429/123

(58) Field of Classification Search
USPC .................... 429/99, 120, 121, 158, 159, 123
See application file for complete search history.

(56) References Cited

U.S. PATENT DOCUMENTS

| | | |
|---|---|---|
| 3,255,387 A | 6/1966 | Giacomello |
| 6,410,184 B1 | 6/2002 | Horiuchi et al. |

(Continued)

FOREIGN PATENT DOCUMENTS

| | | |
|---|---|---|
| DE | 10 2004 035 810 A1 | 2/2006 |
| DE | 10 2004 039 231 A1 | 2/2006 |
| DE | 10 2004 045 182 A1 | 4/2006 |
| DE | 10 2004 054 082 A1 | 5/2006 |
| DE | 10 2005 007 607 A1 | 8/2006 |
| EP | 0 033 697 A2 | 8/1981 |
| EP | 0 571 235 A1 | 11/1993 |
| EP | 1 081 824 A2 | 3/2001 |
| EP | 1 291 885 A1 | 3/2003 |
| EP | 1 571 748 A1 | 9/2005 |
| FR | 1.081.226 | 12/1954 |
| FR | 2 712 733 | 5/1995 |
| FR | 2 863 400 | 6/2005 |
| JP | 2002353078 A | 12/2002 |
| WO | WO 01/80331 A1 | 10/2001 |
| WO | WO 02/49129 A2 | 6/2002 |
| WO | WO 03/092023 A1 | 11/2003 |
| WO | WO 2004/032161 A1 | 4/2004 |
| WO | WO 2005/015585 A1 | 2/2005 |
| WO | WO 2005/086189 A1 | 9/2005 |

*Primary Examiner* — Patrick Ryan
*Assistant Examiner* — Alex Usyatinsky
(74) *Attorney, Agent, or Firm* — Blakely Sokoloff Taylor & Zafman

(57) ABSTRACT

The invention relates to a module including a housing (10) in which are provided at least two electric energy storage assemblies (20) connected by connection means (30) and at least one management electronic board (40) for managing the charging and discharging of the energy storage means (20), wherein the different walls of the housing (10) are in thermal contact while being electrically insulated, respectively, for at least one wall relative to the electric energy storage assemblies (20) and for at least another wall with the management electronic board (40), so as to promote the cooling of said module.

36 Claims, 4 Drawing Sheets

(56) References Cited

U.S. PATENT DOCUMENTS

| | | |
|---|---|---|
| 6,641,942 B1 | 11/2003 | Rouillard et al. |
| 6,650,531 B2 | 11/2003 | Ikeda et al. |
| 6,952,338 B1 | 10/2005 | Gallay et al. |
| 7,016,177 B1 | 3/2006 | Thrap |
| 2002/0043959 A1* | 4/2002 | Tanaka et al. ............ 320/116 |
| 2003/0013009 A1* | 1/2003 | Dansui et al. ............ 429/120 |
| 2003/0027041 A1 | 2/2003 | Hamada et al. |
| 2003/0067735 A1 | 4/2003 | Wilk et al. |
| 2005/0174092 A1 | 8/2005 | Dougherty et al. |
| 2006/0120022 A1 | 6/2006 | Thrap |
| 2006/0141348 A1 | 6/2006 | Wong et al. |
| 2006/0146480 A1* | 7/2006 | Thrap ............ 361/522 |
| 2006/0164812 A1* | 7/2006 | Ha et al. ............ 361/709 |

* cited by examiner though aluminium has good thermal conductivity properties, it is however heavy. On the other hand, a carbon composite material is lighter than aluminium whilst having good thermal conductivity properties;

MODULE FOR AN ELECTRIC ENERGY STORAGE ASSEMBLY

This is a non-provisional application claiming the benefit of International application number PCT/EP2008/054971 filed Apr. 24, 2008.

The present invention concerns the general technical area of assemblies to store electric energy.

More particularly, the invention concerns the area of modules comprising at least two assemblies for electric energy storage.

Under the present invention, by "electric energy storage assembly" is meant either a capacitor (i.e. a passive system comprising two electrodes and an insulator) or a super-capacitor (i.e. a system comprising two electrodes, an electrolyte and a separator), or a battery of lithium battery type (i.e. a system comprising an anode, a cathode and an electrolyte solution between the anode and the cathode).

GENERAL PRESENTATION OF THE PRIOR ART

Modules are known such as shown in FIG. 1, comprising a casing 10 in which several electric energy storage assemblies 20 are arranged, linked by connection means 30.

These modules generally comprise an electronic management board 40 to manage the charging and discharging of the electric energy storage assemblies 20.

As schematically illustrated in FIG. 1, in one embodiment of a prior art module, the storage assemblies 20 are of cylindrical shape and are connected two by two alternately to their upper 21 and lower 22 discs.

The electronic management board 40 is arranged in a central region 11 of the casing 10.

As illustrated in an overhead view in FIG. 2, in another embodiment, the module comprises a plurality of electronic management boards 40 bonded to the connection means 30, in the lower portion of the casing 10.

In both the above-described embodiments, the connection means 30, the energy storage assemblies 20 and the electronic management board(s) 40 produce heat.

Devices have already been proposed enabling dissipation of the heat produced in said modules.

US 2003/013009 describes a module comprising an electronic board and an assembly of batteries electrically connected in series or in parallel. The batteries of the battery assembly are in thermal contact with the walls of a housing of the module via heat transfer plates. The electronic board is not in contact with any of the walls of the housing.

Document US 2006/0164812 describes a system to dissipate heat. This system can be used in a module comprising a casing, storage assemblies inside the casing, and electronic boards outside the casing, the storage assemblies and the electronic boards being in contact with the same walls of the casing.

Document US 2006/141348 describes a module comprising batteries and electronic circuits arranged inside a housing. This module is designed to ensure dissipation of the heat generated inside the housing at the back face thereof by means of heat plates.

Document US 2002/043959 describes a module comprising a housing in which heat transfer plates are arranged, intended to receive a group of batteries, and an electronic board ensuring the charging and discharging of the group of batteries. The heat transfer plates allow the heat produced by the batteries and the electronic board to be conveyed towards the upper and lower walls of the housing.

However, the solutions presented above do not allow sufficient heat management.

The heat produced by the energy storage assemblies is not sufficiently evacuated towards the outside.

Yet temperature is an important ageing factor of energy storage assemblies.

The general purpose of the invention is to propose a module with which it is possible to overcome the shortcoming of existing modules.

PRESENTATION OF THE INVENTION

For this purpose, a module is provided comprising a casing in which at least two electric energy storage assemblies are arranged and linked by connection means, and at least one electronic management board for energy management and diagnosis to control charging and discharging of the electric energy storage assemblies, in which different walls of the casing, whilst being electrically insulated, are in thermal contact respectively:

regarding at least one wall, with heat dissipation elements connected to the electric energy storage assemblies,
regarding at least one other wall, with the electronic management board,
so as to promote cooling of said module.

Therefore, by associating the storage assemblies (via heat dissipation elements) with a first wall of the casing, and the electronic board with a second wall (different from the first wall) it is possible to promote outward evacuation of the heat that is produced inside the module by the electronic management board(s), the connection means and the storage assemblies.

None of the documents US 2003/013009, US 2006/0164812, US 2006/141348 and US 2002/043959 describes a module in which the electronic board and the storage assemblies, whilst being electrically insulated, are in thermal contact with different walls of the casing of the module so that the heat generated by these elements is dissipated by different walls of the casing. This characteristic of the invention allows the heat produced inside the casing to be evacuated more efficiently than in prior art modules.

Preferred, but non-limiting, aspects of the module according to the invention are the following:

the casing comprises fins on at least one outer face of the casing:
the term fins is given here to any device allowing an increase in the convective exchange surface of a part. It is considered that wall stiffeners as well as radiator ribs may form fins in the meaning of the present invention;
this makes it possible to increase the contact surface between the casing and the outside medium in order to promote heat exchanges with the outside, and thereby to improve cooling of the inside of the module;
the fins are arranged on the outer face of at least one wall of the casing in thermal contact with the heat dissipation elements connected to the storage assemblies:
this makes it possible to improve cooling of the storage assemblies;
the fins are arranged on the outer face of at least one other wall of the casing in thermal contact with the electronic management board:
this makes it possible to improve cooling of the electronic board;
the casing may be in aluminium or in a carbon composite material:

- this provides improved heat conduction between the inside and outside of the casing compared with casings in plastic or steel, having equivalent mechanical characteristics;
- the wall in contact with the heat dissipation elements is the lower and/or upper wall of the casing, and the other wall in contact with the electronic management board is a side wall of the casing:
- this makes it possible, for example with cylindrical or parallelepiped storage assemblies arranged parallel to one another and parallel to the side walls of the casing, to improve cooling of the storage assemblies, axial cooling of the storage assemblies being more efficient than radial cooling;
- the wall in thermal contact with the heat dissipation elements may comprise, or be associated with, a base in which a cooling device is arranged:
- this makes it possible to improve cooling of the storage assemblies;
- the cooling device may comprise a circulation circuit for a cooling liquid:
- this makes it possible to increase heat exchanges between the inside and outside of the module;
- the electronic management board comprises a layer of epoxy resin on which a printed circuit in copper is bonded, the epoxy resin layer being in contact with the inner face of the other wall of the casing:
- the layer of epoxy resin allows thermal contacting, whilst ensuring electric insulation, of the copper printed circuit with the casing;
- the electronic management board comprises a plate in aluminium on the layer of epoxy resin, the aluminium plate being in contact with the inner face of the other wall of the casing:
- the aluminium plate promotes evacuation of the heat produced by the copper printed circuit towards the wall of the casing;
- two walls, whilst being electrically insulated, are in thermal contact with the heat dissipation elements connected to the energy storage assemblies:
- this makes it possible to increase the heat exchange surface between the casing and the storage assemblies and hence to improve cooling of the storage assemblies;
- the two walls in thermal contact with the heat dissipation elements connected to the energy storage assemblies are the upper and lower walls of the casing;
- the module comprises at least one electronic management board, said electronic management board being in contact with at least one side wall of the casing;
- the module comprises as many electronic management boards as the casing has side walls, each of said boards being in contact with a respective side wall of the casing:
- this makes it possible to improve cooling of the electronic boards, to optimize the volume of the module and to contribute towards homogenizing temperatures inside the module, the electronic boards then acting as heat buffer avoiding dips in temperature difference between the elements at the core of the module and the elements located on the periphery, as compared with prior art modules in which boards arranged in the centre, above or below the module accentuated the differences in temperature between the central elements and peripheral elements; this arrangement has an important consequence on the global lifetime of the module, this lifetime itself being strongly related to temperature imbalance which may be suffered by the different elements of the module; advantageously the connection boards may be in contact with the inner face of the side wall of the casing, or with the outer face of the side wall of the casing.
- the connection means between two adjacent storage assemblies comprise two covers electrically connected by a terminal strip, each cover comprising a connection terminal intended to be in contact with a through borehole of the terminal strip; the connection means between two adjacent storage assemblies comprise two covers electrically connected by a terminal strip, each cover able to be joined to the terminal strip by laser transparent welding, brazing or diffusion-brazing;
- the borehole passing through the terminal strip has high surface roughness to promote electrical contact with the connection terminal;
- the contact surface between the terminal strip and a cover is preferably equal to or more than one quarter of the cover surface, and further preferably equal to or more than one half of the cover surface;
- the terminal strips may also be in copper;
- this makes it possible to reduce the ohmic resistance of the connection means, and thereby to minimize losses through Joule effect and hence the heat produced by the connection means;
- the terminal strips are in aluminium:
- this makes it possible to improve heat conduction between the storage assemblies and the casing, and to reduce the weight of the connection elements;
- the terminal strips in copper (or aluminium) may be tin-plated as surface protection;
- two adjacent storage assemblies are electrically connected by a longitudinal part whose ends form the respective upper and lower covers of each of the adjacent storage assemblies so as electrically to connect said adjacent storage assemblies;
- this makes it possible to maximize the contact surface between the energy storage elements and the walls of the casing, to promote heat diffusion towards the casing, whilst the use of connection means made in a single piece allows the internal resistance of the connection means to be reduced (and hence the production of heat by Joule effect);
- each end of the longitudinal part comprises preferential thinned regions;
- the connection means between adjacent storage assemblies may comprise two covers connected electrically by a terminal strip that is laser transparent welded; in this case the welding of the terminal strip may be made through the preferential thinned regions;
- the connection means between two adjacent storage assemblies may comprise two covers electrically connected by a terminal strip brazed onto the covers;
- the connection means between two adjacent storage assemblies comprise two covers electrically connected by a terminal strip joined to the cover by diffusion-brazing;
- the contact surface between the terminal strip and a cover is preferably equal to or greater than one quarter of the cover surface, and further preferably is equal to or greater than one half of the cover surface;
- two adjacent storage assemblies may be electrically connected by a longitudinal part whose ends form the respective upper and lower covers of each of the adjacent storage assemblies, so as electrically to connect said adjacent storage assemblies; in this case, each end of the longitudinal part comprises preferential radial thinned regions;

the preferential thinned regions may be perpendicular two by two and have an angle of 45° with the longitudinal axis B-B of the part;

the preferential thinned regions may lie perpendicular two by two, at least one region of each end extending along the longitudinal axis B-B of the part;

the connection means may comprise the heat dissipation elements;

the heat dissipation elements may comprise a layer of elastomer;

the elastomer layer allowing the storage assemblies to be electrically insulated and thermally connected to the casing.

PRESENTATION OF THE FIGURES

Other characteristics, purposes and advantages of the present invention will arise from the following description, which is solely illustrative and non-limiting, and is to be read with reference to the appended drawings in which.

Figure 1:
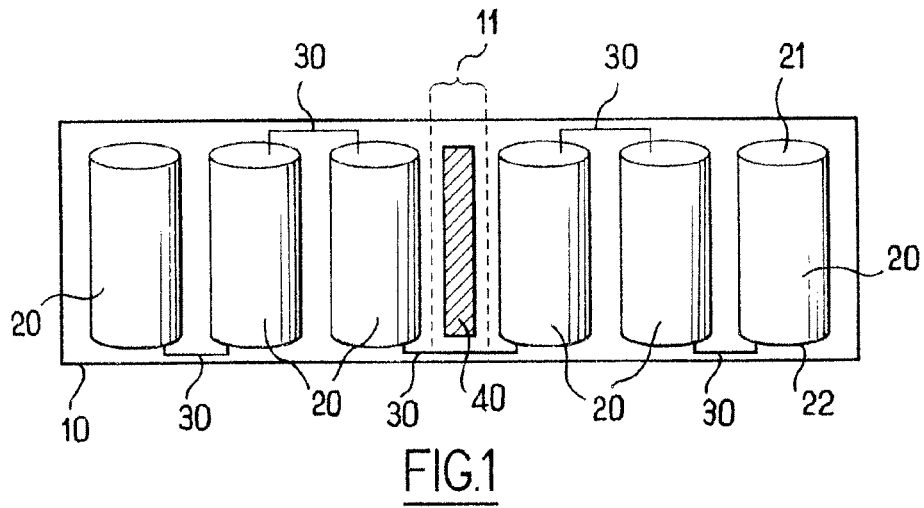
FIG. 1 illustrates one embodiment of a prior part module.
Figure 2:
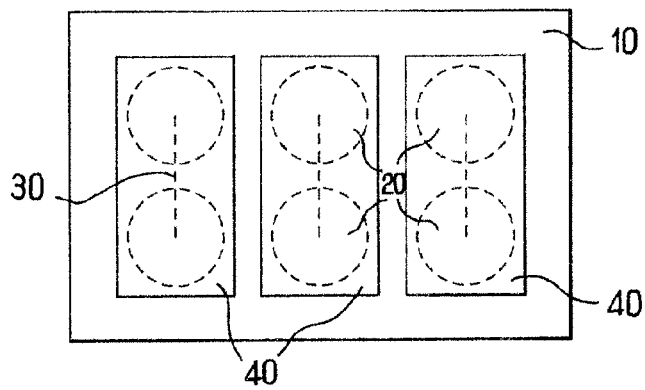
FIG. 2 illustrates another embodiment of a prior art module.
Figure 3A:
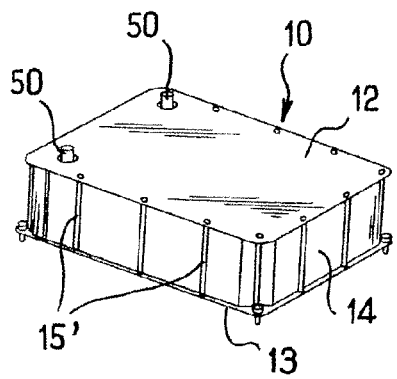
Figure 3B:
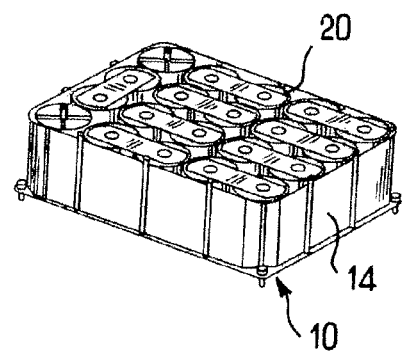
Figure 3C:
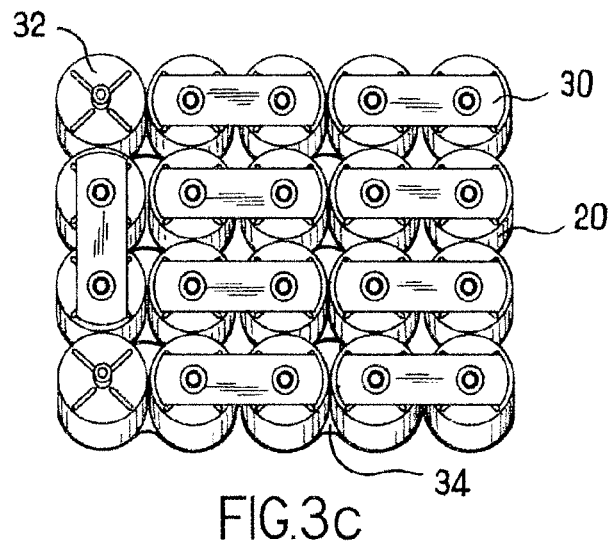
Figure 3D:
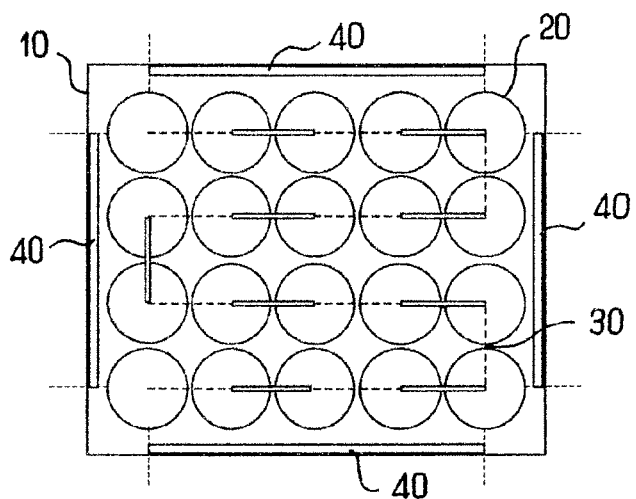
Figure 4:
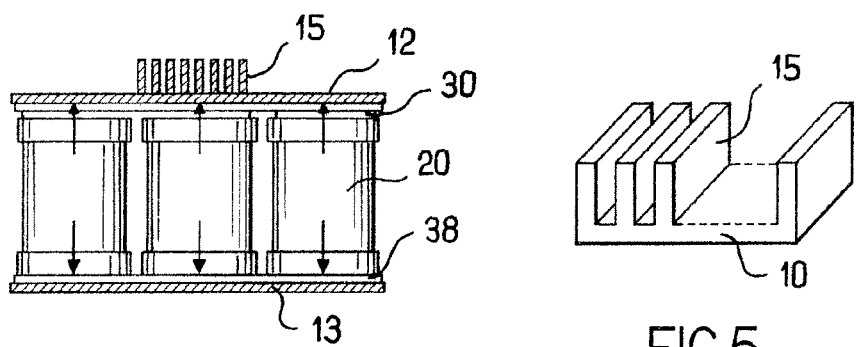
Figure 5:
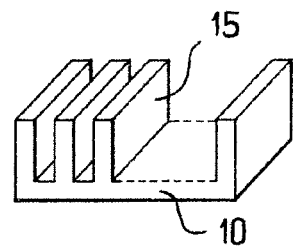
Figure 8:
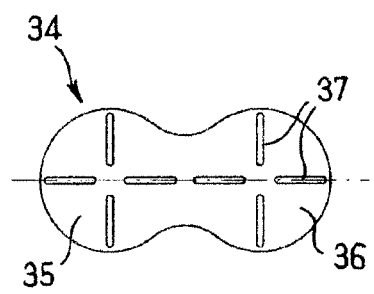
Figure 9:
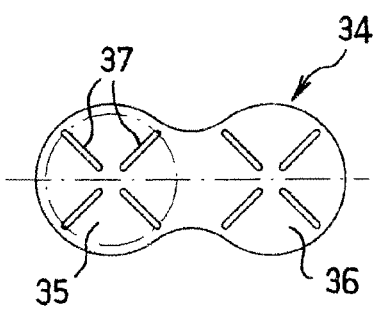
Figure 10:
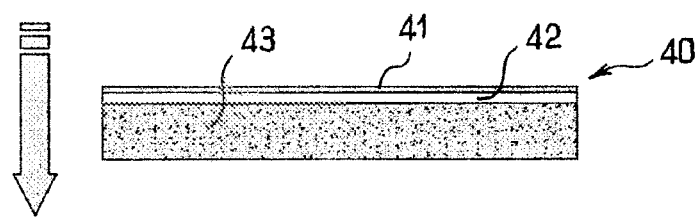
Figure 11:
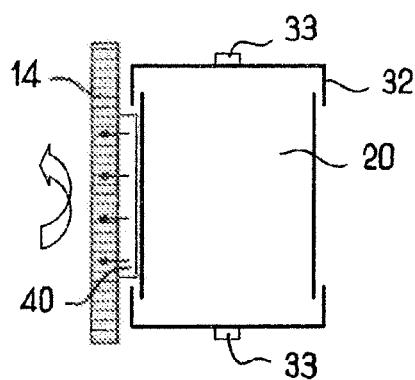

FIGS. 3a to 3d illustrate one embodiment of a module according to the invention, FIG. 4 illustrates another embodiment of the module, FIG. 5 is an illustration of fins in one embodiment of the module, FIGS. 6 to 9 illustrate examples of connection means connecting the energy storage elements together inside the module, FIGS. 10 and 11 illustrate examples of electronic management boards of the module.

DESCRIPTION OF THE INVENTION

Different embodiments of the module according to the invention will now be described with reference to FIGS. 3 to 11. In these different figures, equivalent elements of the module carry the same reference numbers.

With reference to FIG. 3a, an embodiment of the module is illustrated intended to be connected via voltage terminals 50 to an annex device (not shown).

The module comprises a casing 10 in which electric energy storage assemblies 20 are arranged, connected by connection means 30.

The module also comprises an electronic management board 40 to manage energy and diagnose the energy storage assemblies 20.

The storage assemblies 20 are of globally cylindrical shape. The storage assemblies 20 are arranged side by side in the casing 10. In other words, the axis of revolution of the storage assemblies 20 are parallel. In other variants, not shown here, the storage elements may be of parallelepiped, square, oval, hexagonal shape without this modifying the general principles of the invention.

In the embodiment illustrated in FIGS. 3a to 3d, the storage assemblies 20 are arranged so that their axis of revolution are perpendicular to the upper 12 and lower 13 walls of the casing 10.

Advantageously, different walls 12, 13, 14 of the casing 10, whilst being electrically insulated, have thermal contact respectively:

regarding at least one wall, with heat dissipation elements connected to the electric energy storage assemblies, regarding at least one other wall, with the electronic management board.

This promotes cooling of the module.

The thermal connection of the storage assemblies with a first wall 12, 13 and of the electronic management board 40 with a second wall 14 different from the first wall 12, 13 allows maximum thermal dissipation of the heat emitted by the board 40 and the storage assemblies 20, towards outside the module.

The heat dissipation elements may comprise the connection means 30.

The dissipation elements 38 may also comprise a layer of elastomer arranged between the connection means 30 and the wall of the casing in thermal contact with the storage assemblies 20.

The elastomer layer covers several functions simultaneously.

It provides:

electric insulation of the storage assemblies 20 with respect to the casing 10 by means of a breakdown voltage of more than 1 kV, absorption of the geometric dispersions of the storage assemblies 20 due to manufacturing tolerances, by means of its aptitude for compression, improvement in heat exchanges between the storage assemblies 20 and outside the module.

In one advantageous embodiment, the wall in contact with the heat dissipation elements is the lower wall 13 of the casing 10, and the wall in contact with the electronic management board 40 is a side wall 14 of the casing 10.

The storage assemblies 20 preferably conduct heat along their axis of revolution (longitudinal axis) so that axial cooling of the storage assemblies 20 is more efficient than radial cooling thereof.

Depending upon embodiment, the storage assemblies 20 are thermally connected either to the upper wall 12, or to the lower wall 13, or to the upper and lower walls 12, 13 of the casing 10.

In the embodiment illustrated in FIG. 4, the storage assemblies 20 are thermally connected to the upper and lower walls 12, 13.

The thermal contacting of the storage assemblies with two walls allows improved cooling of the storage assemblies through an increase in the heat exchange surface between the storage assemblies 20 and outside of the module.

The Casing

The casing 10 allows handling of the module, reinforces electric insulation and protects the core of the module and its electronics against potential external attack.

This casing may be parallelepiped, to be arranged in the place currently taken up by a battery of an automotive vehicle, or it may be cylindrical to be housed for example in the space freed by a spare wheel, or prismatic, in all cases defining upper and lower faces and side faces.

In one embodiment, the upper 12, lower 13 and side walls of the casing 10 are in anodized aluminium firstly to promote cooling of the module via improved radiating dissipation, and secondly to reinforce the module's corrosion resistance.

Therefore, use of the walls 12, 13, 14 in aluminium or in carbon composite material provides improvement in heat conduction between the inside and outside of the casing, compared with walls in plastic material or in steel with identical mechanical characteristics. This increases the efficacy of cooling of the storage assemblies 20 and of the electronic board 40.

In some variants of embodiment of the invention, the casing 10 comprises fins 13 as illustrated in FIGS. 4 and 5.

These fins provide an increased contact surface between the casing 10 and the outside medium to promote heat exchanges with the outside. This improves cooling of the module.

The fins 15 can be arranged on at least one outer face of a wall 12, 13, 14 of the casing 10. The stiffeners 15' arranged on the side walls also form fins in the meaning of the present patent, since they allow the convective exchange surface of the walls to be increased.

For example, in one embodiment, the fins 15 are arranged on the outer face of the wall of the casing in thermal contact with the storage assemblies 20, so as to improve cooling of said storage assemblies 20.

In the embodiment illustrated in FIG. 4, the fins 15 are arranged in a central region 11 of the outer face of the upper wall 12 of the casing 10.

This facilitates evacuation of the heat produced by the assemblies 20 positioned in the centre of the casing 10 (i.e. the assemblies 20 the most distant from the side walls 14) and for which evacuation of heat is more difficult than for the assemblies 20 positioned on the periphery of the casing 10 (i.e. the assemblies 20 the closest to the side walls 14).

In another embodiment, the fins 15 are arranged on the outer face of the wall of the casing 10 in thermal contact with the electronic management board 40, so as to improve cooling of said electronic management board 40.

Advantageously, in another embodiment the outer faces of the walls 12, 13, 14 in thermal contact firstly with the storage assemblies 20 and secondly with the electronic board(s) 40, comprise fins 15.

If several walls of the casing are in thermal contact with the storage assemblies and/or with the electronic management board(s), all these walls in thermal contact, or only some of these walls, may comprise fins on their outer face.

To further improve evacuation of the heat produced by the storage assemblies 20, in one variant of embodiment of the invention, the wall in thermal contact with the storage assemblies 20 comprises, or is associated with, a base (not shown) in which a cooling device (not shown) is arranged.

The cooling device may comprise a circulation circuit for a cooling liquid.

If several walls of the casing are in thermal contact with the storage assemblies, the module may comprise a cooling device in only one or in all the walls in thermal contact with the assemblies 20.

This allows improved cooling of the module by taking advantage of an external cooling system e.g. of a vehicle using the module, such as a vehicle air-conditioning circuit.

Electric Energy Storage Assembly

In the embodiment illustrated in FIGS. 3a to 3d, the module comprises twenty electric energy storage assemblies 20. The storage assemblies are of globally cylindrical shape.

The storage assemblies 20 are arranged in the casing 10, parallel to one another and parallel to the side walls of the casing. In other words, the axis of revolution of the storage assemblies 20 are parallel to each other and parallel to each plane along which a respective side wall extends.

In the embodiment illustrated in FIGS. 3a to 3d, the storage assemblies 20 are arranged so that their axis of revolution are perpendicular to the upper 12 and lower 13 walls of the casing 10.

The storage assemblies 20 are connected two by two by the connection means 30 which will be described in detail in the remainder of the description.

It will be noted that in the embodiment illustrated in FIGS. 3a to 3d, the twenty electric energy storage assemblies 20 are connected in series.

These storage assemblies 20 are connected two by two at their upper 32 and lower 32' covers alternately. In other words, with reference to one storage assembly, this is connected by its upper cover to a first adjacent storage assembly, and by its lower cover to a second adjacent storage assembly different from the first storage assembly.

Evidently, configurations other than the configuration in series can be adopted, in relation to applications. For example, for a module comprising twenty storage assemblies 20 one pair of ten storage assemblies 20 in series can be connected in series, and this pair can be connected in parallel, etc.

The storage assemblies are electrically insulated from the walls 12, 13, 14 of the casing 10.

Electronic Management Board

In the embodiment illustrated in FIGS. 3a to 3d, the device also comprises four electronic management boards 40.

The electronic management board 40 is used to manage charging and discharging and the diagnosis of the energy storage assemblies 20. By diagnosis here is meant all measurements of temperature, pressure, voltage and current allowing measurement and/or calculation of the charge status or health status of the module throughout its active lifetime.

In particular, the electronic board can meet two separate needs:
- balancing of end-charge voltages of the storage assemblies 20 of the module,
- voltage instrumentation of the module.

The storage elements 20 effectively have characteristics (capacity, resistance) showing dispersions due to manufacture and/or ageing, etc.

These differences mean that when charging the module, not all the storage assemblies 20 have the same charge voltage.

Balancing therefore comprises homogenization of these voltages around one same voltage value defined in relation to the intended application.

The electronic management board is connected in parallel to the storage assemblies associated in series.

The electronic management board 40 is electrically insulated from the walls of the casing 10.

An electronic management board 40 comprises a layer of epoxy resin 42 on which a copper printed circuit 41 is bonded.

The layer of epoxy resin 42 allows the thermal contacting of the copper printed circuit 41, whilst ensuring electric insulation, with the casing 10.

The electronic management board 40 is arranged so that the layer of epoxy resin 42 comes into contact with the inner face of the wall 14 of the casing 10.

In the remainder hereof it is to be understood that when an element A is mentioned as being "on" an element B, it may lie directly on element B or it may be positioned above element B but separated from element B by one or more other intermediate elements.

It is also to be understood that when an element A is mentioned as being "on" an element B, it may cover the entire surface of element B or only a portion of element B.

In one embodiment illustrated in FIG. 10, the electronic management board 40 comprises an aluminium plate 43 on the layer of epoxy resin 42 (so that the layer of epoxy resin is positioned between the copper printed circuit and the aluminium layer).

In this case, it is the aluminium plate which is placed in contact with the inner face of wall 14 of the casing 10.

The presence of an aluminium layer 43 on the electronic management board 40 promotes the evacuation of heat from the copper printed circuit 41 towards the wall 14 of the casing in contact with the electronic management board 40.

In the embodiment illustrated in FIGS. 3a to 3d, the module comprises four electronic management boards 40 thermally connected to the inner faces of the four side walls 14 of the casing 10.

Evidently, the electronic boards 40 can be arranged outside the casing and in this case are thermally connected to the outer faces of the side walls of the casing. The advantage of said arrangement is that cooling of the boards is further improved and their maintenance made easier without having to open the casing, but it has the disadvantage of more easily exposing the boards to outside impact and requiring improved sealing of the casing walls.

The presence of four electronic boards on the four side walls of the module prevents the storage assemblies positioned on the periphery of the casing from cooling quicker than the storage assemblies 20 positioned in the centre of the casing.

The electronic boards 40 in this case effectively act as heat buffer. The presence of these heat buffers on the side walls means that the storage assemblies 20 arranged in the proximity of the side walls 14 will cool less quickly, so that all the storage assemblies 20 of the module will cool at the same rate.

Heat being the main cause of ageing of storage assemblies 20, homogenization of the temperature inside the module leads to homogenized ageing of the storage assemblies 20 of the module.

Evidently, the number of electronic boards will be optimized in relation to the thermal result to be achieved, without the number of boards necessarily being identical to the number of side walls of the casing, in particular when the casing is of circular or complex shape due to the particular environment in which the module is to be used.

Connection Means

Figure 6:
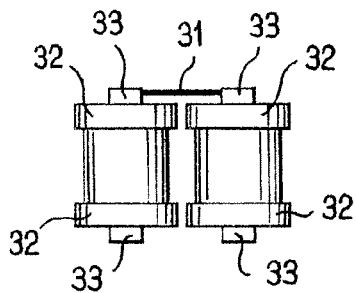

In one embodiment illustrated in FIG. 6, the connection means 30 between two adjacent storage assemblies 20 comprise two covers 32 or 32' electrically connected by a terminal strip 31.

Each cover 32, 32' is intended to cap a storage assembly 20.

Each cover 32, 32' comprises a connection terminal 33 intended to be in contact with a through borehole (not shown) of the terminal strip 31. To improve electric conduction between the terminal 33 and the terminal strip 31, the surface condition of the through borehole can be made rough to increase the contact surface.

In one embodiment, the terminal strips 31 are in copper. This allows the ohmic resistance of the connection means 30 to be reduced and hence minimizes losses through Joule effect. Therefore the production of heat by the connection means 30 is reduced inside the module.

In another embodiment, the terminal strips 31 are in aluminium. This improves the weight of the connection means whilst maintaining ohmic resistance between the storage assemblies and satisfactory heat conduction between the storage assemblies 20 and the casing 10.

In one variant, the terminal strips 31 may be coated with a surface treatment of nickel or tin plating type to protect against corrosion, but also to improve electric contact.

For each storage assembly 20, the upper cover 32 of the assembly 20 is electrically connected with the upper cover 32 of an adjacent assembly, whilst the lower cover 32' of the same assembly is electrically connected with the lower cover 32' of another adjacent storage assembly so that each storage assembly 20 can be connected to two adjacent storage assemblies 20, one at its upper cover 32 and the other at its lower cover 32'.

Figure 7A:
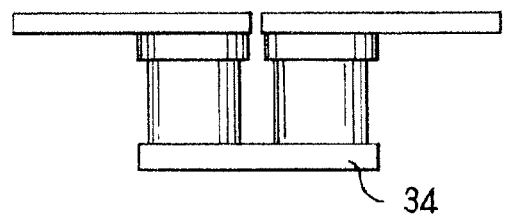

In the embodiment shown in FIG. 7a, the energy storage assemblies have flat covers without a connection terminal. They are then welded or brazed in pairs with their neighbours by means of terminal strips welded or brazed in the same arrangement as described in the preceding paragraph. If laser transparent welding is used, the terminal strips may have preferential thinned regions, similar to those described below with reference to the welding of bi-covers.

The contact surface between the terminal strip 31 and a cover 32 is preferably equal to or greater than one quarter of the surface of the cover 32, and further preferably equal to or greater than one half of the surface of the cover 32, even equal to the entirety of the cover surface.

With this configuration of the storage assemblies it is possible to maximize the contact surface between the terminal strip 31 and the cover 32, 32', and hence to promote heat exchanges between the cover 32, 32' and the casing through the terminal strip 31.

Figure 7B:
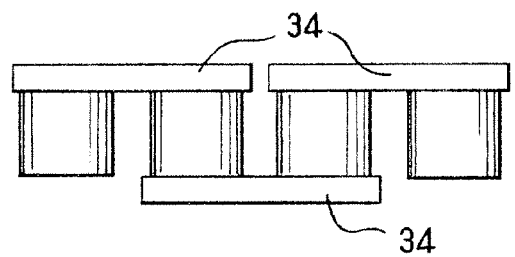
Figure 7C:
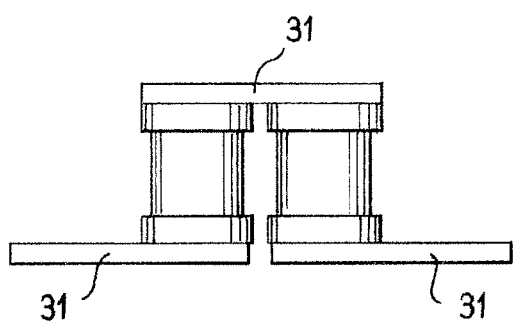
Figure 7D:
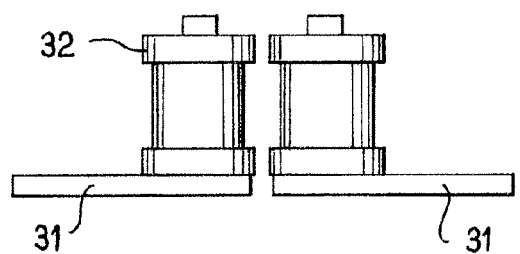
Figure 7:
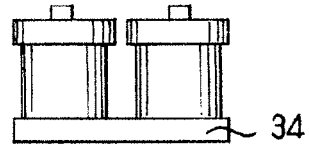

In another embodiment illustrated in FIGS. 7, 8 and 9, the connection means 30 comprise a longitudinal part 34, called a bi-cover, whose ends 35, 36 form upper 32 or lower 32' covers of two adjacent storage assemblies 20 for their electrical connection.

The use of the longitudinal part 34 for electrical connection of two adjacent storage assemblies makes it possible to increase the electrical and thermal performance of the modules.

Regarding electrical performance, the use of connection means made in a single piece makes it possible to reduce the internal resistance of the connection means (and hence the production of heat through Joule effect). Regarding thermal performance, the use of connection means in a single piece, able to form upper (or lower) covers of two storage assemblies, provides increased surface contact between the storage assemblies 20 and the walls of the module which promotes thermal diffusion towards the casing 10.

If the bi-covers are joined by laser transparent welding, each end 35, 36 of the bi-cover 34 comprises preferential thinned regions 37 to form welding regions.

In the embodiments illustrated in FIGS. 8 and 9, the preferential thinned regions 37 are radial and perpendicular two by two.

In the embodiment illustrated in FIG. 8, a preferential thinned region 37 of each end 35, 36 extends along the longitudinal axis B-B of the longitudinal part 34.

It is thereby possible to reduce the internal resistance of the longitudinal part 34 (and hence heat production through Joule effect of the connection means 30). However, in this case, the current circulates chiefly at the rectilinear thinned regions extending along the longitudinal axis B-B of the longitudinal part 34. This may cause local heating of the longitudinal part at the rectilinear thinned regions extending along the longitudinal axis B-B of the longitudinal part 34.

In the embodiment illustrated in FIG. 9, the radial rectilinear thinned regions 37 are perpendicular two by two and have an angle of 45° with the longitudinal axis of the part. It is thereby possible to avoid the risks of deterioration related to local heating as above-mentioned.

Alternatives

Readers will appreciate that numerous modifications may be made to the module described in the foregoing without making any material departure from the novel teachings and advantages described herein.

Therefore any modifications of this type are intended to be incorporated in the scope of the module such as defined in the appended claims.

For example, the number of storage assemblies of the module can be greater or lesser than 20. For example, the module may comprise two electric energy storage assemblies, or more than two storage assemblies.

For example, the energy storage elements may be connected together by a combination of the means described above:
  bi-covers on bottom-side and covers with terminals on topside (FIG. 7),
  bi-covers on bottom-side and welded or brazed flat covers on topside (FIG. 7a),
  bi-covers on bottom-side and topside (FIG. 7b),
  terminal strips welded on topside and bottom-side (FIG. 7c),
  covers with terminals on topside and welded terminal strips on bottom side (FIG. 7d)
  covers with terminals on top and bottom side (FIG. 6),
in relation to assembly constraints and manufacturing needs.

Similarly, the number of electronic management boards may be greater or less than 4. For example, the module may comprise a single management board.

In this case, the two storage assemblies are thermally connected to a first wall and the electronic management board is connected to a second wall—different from the first wall—so as to increase heat exchanges with the outside, and hence promote evacuation of the heat produced by the storage assemblies, the connection means and the electronic management board.

Also, the different embodiments described above presented:
  the storage assemblies as being thermally connected either to the lower wall of the casing or to the upper wall of the casing, or to the upper and lower walls of the casing, and
  the electronic management board as being connected to one, two, three or four side walls of the casing.

Similarly, the geometric arrangement of the storage elements is described above as being square, but may also be of any shape such as triangular, parallelogram, hexagonal, octagonal, etc.

Advantageously readers will appreciate that the thermal connections of the storage assemblies and of the electronic management boards may be reversed, namely:
  the storage assemblies may be connected to one or more side walls of the casing, for example if the energy storage elements are arranged flat to comply with axial evacuation of heat towards outside the casing. The electronic management boards may be connected to the upper wall or to the lower wall, or to the upper and lower walls.

To simplify the description, we have described modules extending globally vertically. Evidently, the modules could be oriented in any direction without departing from the scope of the invention.

Also, in the present description, the storage assemblies and their orientation have been defined with respect to storage assemblies having a circular cross-section. Evidently, the storage assemblies could have any cross-section.

Finally, the foregoing descriptions have been proposed with respect to a module construction comprising a single level of elements, but evidently the invention may also be applied to modules comprising several layers of elements, the heat exchanges with the casing applying to the outer layers of the assembly.

The invention claimed is:

1. Module comprising a casing comprising at least two opposite walls and at least one different wall other than said two opposite walls, at least two electric energy storage assemblies (20) being arranged in a plurality of lines respectively in said casing so that their axis of revolution are perpendicular to said two opposite walls (12, 13) of the casing (10), said at least two electric energy storage assemblies being connected by connection means, and at least one electronic board (40) for energy management and diagnosis of the energy storage assemblies is arranged in said casing,
  wherein
    said two opposite walls (12, 13) and said at least one different wall (14) of the casing, are electrically insulated,
    one of the two opposite walls (12, 13) being in physical contact with heat dissipation elements (15) which are connected to the electric energy storage assemblies (20), while said one of the two opposite walls is not in physical contact with the electronic management board,
    said at least one different wall (14) being in physical contact with the electronic management board, while said at least one different wall is not in physical contact with the heat dissipation elements (15), and
    said electric energy storage assemblies being in thermal contact with one of the two opposite walls by the way of the heat dissipation elements, while the electronic management board is in thermal contact with said different wall in order to promote cooling of said module.

2. Module according to claim 1, wherein the casing comprises fins on at least one outer face of the casing.

3. Module according to claim 2, wherein the fins are arranged on the outer face of the wall of the casing in contact with the heat dissipation elements connected to the storage assemblies.

4. Module according to claim 2, wherein the fins are arranged on the outer face of the other wall of the casing in contact with the electronic management board.

5. Module according to claim 1, wherein the casing is in aluminium.

6. Module according to claim 1, wherein the casing is in carbon composite material.

7. Module according to claim 1, wherein the wall in contact with the heat dissipation elements is the lower wall of the casing and the other wall in contact with the electronic management board is a side wall of the casing.

8. Module according to claim 1, wherein the wall in contact with the heat dissipation elements comprises or is associated with a base in which a cooling device is arranged.

9. Module according to claim 8, wherein the cooling device comprises a circulation circuit for a cooling liquid.

10. Module according to claim 1, wherein the electronic management board comprises a layer of epoxy resin on which a copper printed circuit is bonded.

11. Module according to claim 10, wherein the epoxy resin layer is in contact with the inner face of the other wall of the casing.

12. Module according to claim 10, wherein the electronic management board comprises an aluminium plate on the epoxy resin layer, the aluminium plate being in contact with the inner face of the other wall of the casing.

13. Module according to claim 1, wherein the two walls whilst being electrically insulated are in contact with the heat dissipation elements connected to the energy storage assemblies.

14. Module according to claim 13, wherein the two walls in contact with the heat dissipation elements connected to the energy storage assemblies are the upper and lower walls of the casing.

15. Module according to claim 1, wherein it comprises at least one electronic management board, said electronic management board being in contact with at least one side wall of the casing.

16. Module according to claim 15, wherein it comprises as many electronic management boards as the casing has side walls, each of said boards being in contact with a respective side wall of the casing.

17. Module according to claim 15, wherein the management boards are in contact with the inner face of the side wall of the casing.

18. Module according to claim 15, wherein the management boards are in contact with the outer face of the side wall of the casing.

19. Module according to claim 1, wherein the connection means between two adjacent storage assemblies comprise two covers electrically connected by a terminal strip, each cover comprising a connection terminal intended to be in contact with a through borehole of the terminal strip.

20. Module according to claim 19, wherein the borehole passing through the terminal strip has high surface roughness to promote electrical contact with the connection terminal.

21. Module according to claim 19, wherein the terminal strips are in copper.

22. Module according to claim 21, wherein the terminal strips in copper comprise tin-plating as surface protection.

23. Module according to claim 9, wherein the terminal strips are in aluminium.

24. Module according to claim 23, wherein the terminal strips in aluminium comprise tin-plating or nickel-plating as surface protection.

25. Module according to claim 1, wherein the connection means between two adjacent storage assemblies comprise two covers electrically connected by a terminal strip joined by laser transparent welding.

26. Module according to claim 25, wherein the welding of the terminal strip is made through preferential thinned regions.

27. Module according to claim 1, wherein the connection means between two adjacent storage assemblies comprise two covers electrically connected by a terminal strip brazed onto the covers.

28. Module according to claim 1, wherein the connection means between two adjacent storage assemblies comprise two covers electrically connected by a terminal strip by diffusion-brazing of the terminal strip onto the covers.

29. Module according to claim 19, wherein the contact surface between the terminal strip and a cover is equal to or more than one quarter of the surface of the cover.

30. Module according to claim 17, wherein the contact surface between the terminal strip and a cover is equal to or more than one half of the surface of the cover.

31. Module according to claim 1, wherein two adjacent storage assemblies are electrically connected by a longitudinal part whose ends form the respective upper or lower covers of each of the adjacent storage assemblies, on as electrically to connect said adjacent storage assemblies.

32. Module according to claim 31, wherein each end of the longitudinal part comprises preferential radial thinned regions.

33. Module according to claim 31, wherein the preferential thinned regions are perpendicular two by two and have an angle of 45° with the longitudinal axis (B-B) of part.

34. Module according to claim 31, wherein the preferential thinned regions are perpendicular two by two, at least one region of each end extending along the longitudinal axis (B-B) of part.

35. Module according to claim 1, wherein the connection means comprise the heat dissipation elements.

36. Module according to claim 1, wherein the heat dissipation elements between the elements and the wall of the module comprise a layer of elastomer.

* * * * *

UNITED STATES PATENT AND TRADEMARK OFFICE
CERTIFICATE OF CORRECTION

| | | |
|---|---|---|
| PATENT NO. | : 8,795,869 B2 | Page 1 of 1 |
| APPLICATION NO. | : 12/597484 | |
| DATED | : August 5, 2014 | |
| INVENTOR(S) | : Olivier Caumont et al. | |

It is certified that error appears in the above-identified patent and that said Letters Patent is hereby corrected as shown below:

In The Claims

Column 13, Claim 23, line 27, please delete "9" and insert --19--.

Column 14, Claim 31, line 19, please delete "on" and insert --so--.

Signed and Sealed this
Seventeenth Day of February, 2015

Michelle K. Lee
*Deputy Director of the United States Patent and Trademark Office*